Fig. I.

WITNESSES
Wm. B. Sellers.
James F. Young

INVENTOR
Richard F. J. Filipowsky.
BY V. W. Cease
ATTORNEY

May 11, 1965 R. F. J. FILIPOWSKY 3,183,442
PHASEPROOF PULSE SIGNAL TRANSMISSION SYSTEM UTILIZING BINARY TO QUATERNARY CONVERSION MEANS
Filed Oct. 9, 1959
3 Sheets-Sheet 3
| Binary Output | 11 | 10 | 01 | 00 |
|---|---|---|---|---|
| Quaternary Output | a | b | c | d |
Fig. 4.
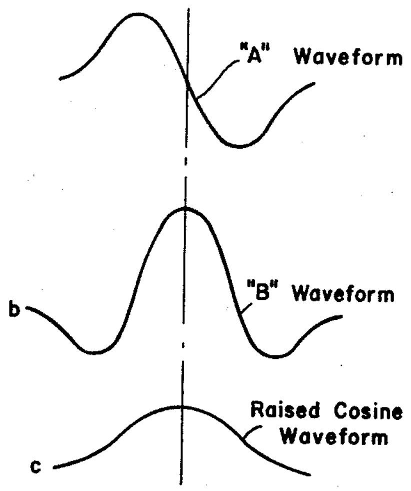
Fig. 5.
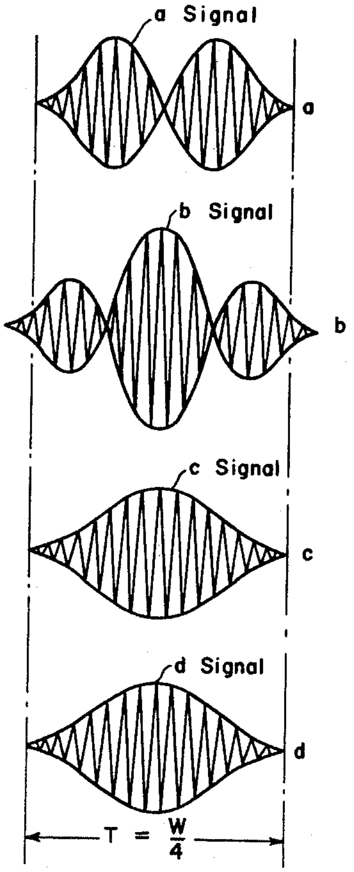
Fig. 6.
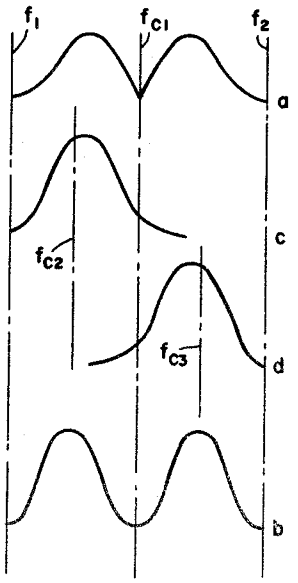
Fig. 7.

United States Patent Office
3,183,442
Patented May 11, 1965

3,183,442

PHASEPROOF PULSE SIGNAL TRANSMISSION SYSTEM UTILIZING BINARY TO QUATERNARY CONVERSION MEANS

Richard F. J. Filipowsky, Glen Burnie, Md., assignor to Westinghouse Electric Corporation, East Pittsburgh, Pa., a corporation of Pennsylvania Filed Oct. 9, 1959, Ser. No. 845,548
2 Claims. (Cl. 325—40)

This invention relates to a method and apparatus for transmitting intelligence from a transmitting to a receiving station, and more specifically, to a system which transmits intelligence with four symbolic message signals.

It is well-known that digital transmission meets with severe difficulties and is in many cases unreliable, due to the high error rate which many data systems experience under conditions where voice communication circuits still operate satisfactorily. This is particularly true in the case of multipath channels carrying digital information. These difficulties occur in the conventional digital modulation systems, such as on-off keying, frequency shift keying or digital transmission over single sideband. These difficulties are caused by the superposition of many transmission paths of different and frequently slowly varying length, causing a multitude of signals to arrive at the receiver in irregularly spaced time sequence, when there was in fact only one channel of transmission. Additionally, such difficulties occur due to the indefinite character of the phase of the received radio frequency wave, when such multipath or plural signals are simultaneously present at the receiver input.

To overcome these difficulties very short signals have been transmitted to keep the echo-time after each signal free from any further information, allowing the receiver to integrate over all echos or to compensate for their different arrival times. This method as employed in scatter communication systems has been of rather doubtful value, since there is no clearly defined minimum paths difference, but rather a wide continuous broadening of the energy transmitted by a very short pulse.

A further method to overcome these difficulties, has been to transmit very long signals, possibly much longer than the longest transmission time difference between any 2 major multipath beams, and to depend for the reception of the signals on the stationary superposition of all echo signals, thus making the influence of the indefinite periods at the beginning and at the end of the signal negligible. In this method however, the phase of the signal varies considerably so as to make impractical such a method of any modulation system which depends on absolute phase reference such as the single-sideband. Additionally, very long signals cannot be employed in systems which depend on a measurement of the phase differences between consecutive signals for transmitting intelligence since these also are bound to suffer from the rapid changes of the resulting phase of the received multipath signal.

It is therefore an object of the invention to provide a transmission system which will accurately and reliably transmit intelligence from a transmitting station to a receiving station.

It is a further object of the invention to provide a method and apparatus for transmitting intelligence that is not effected by a phase shift between signals.

A still further object of the invention is the provision of a transmission system for transmitting binary or digital information which is unaffected by the change in phase of the signals being transmitted due to the characteristics of the transmission path.

Another object of the invention is to provide a digital or binary transmission system wherein the adverse affect of echo signals and phase changes of the signals due to transmission, is minimized.

An additional object of the invention is the provision of a binary or digital transmission system which has a relatively high information rate yet is relatively unaffected by phase changes of the transmitted signals and echo signals resulting during the transmission thereof.

An additional object of the invention is the provision of a double sideband binary transmission system which has a relatively low error rate and which is relatively unaffected by the phase change of the signals being transmitted, due to the many transmission paths of different and frequently slowly varying length.

Other objects of the invention will be apparent from the following description taken in conjunction with the accompanying drawings, in which:

FIG. 4 is a chart useful in explaining this invention;

FIG. 5 is a graphical representation of waveforms employed in the system shown in FIGS. 1, 2 and 3;

FIG. 6 is a graphical representation of waveforms employed in the system shown in FIGS. 1, 2 and 3, and useful in explaining the invention; and FIG. 7 is the power spectra of the waveforms shown in FIG. 6.

Figure 1:
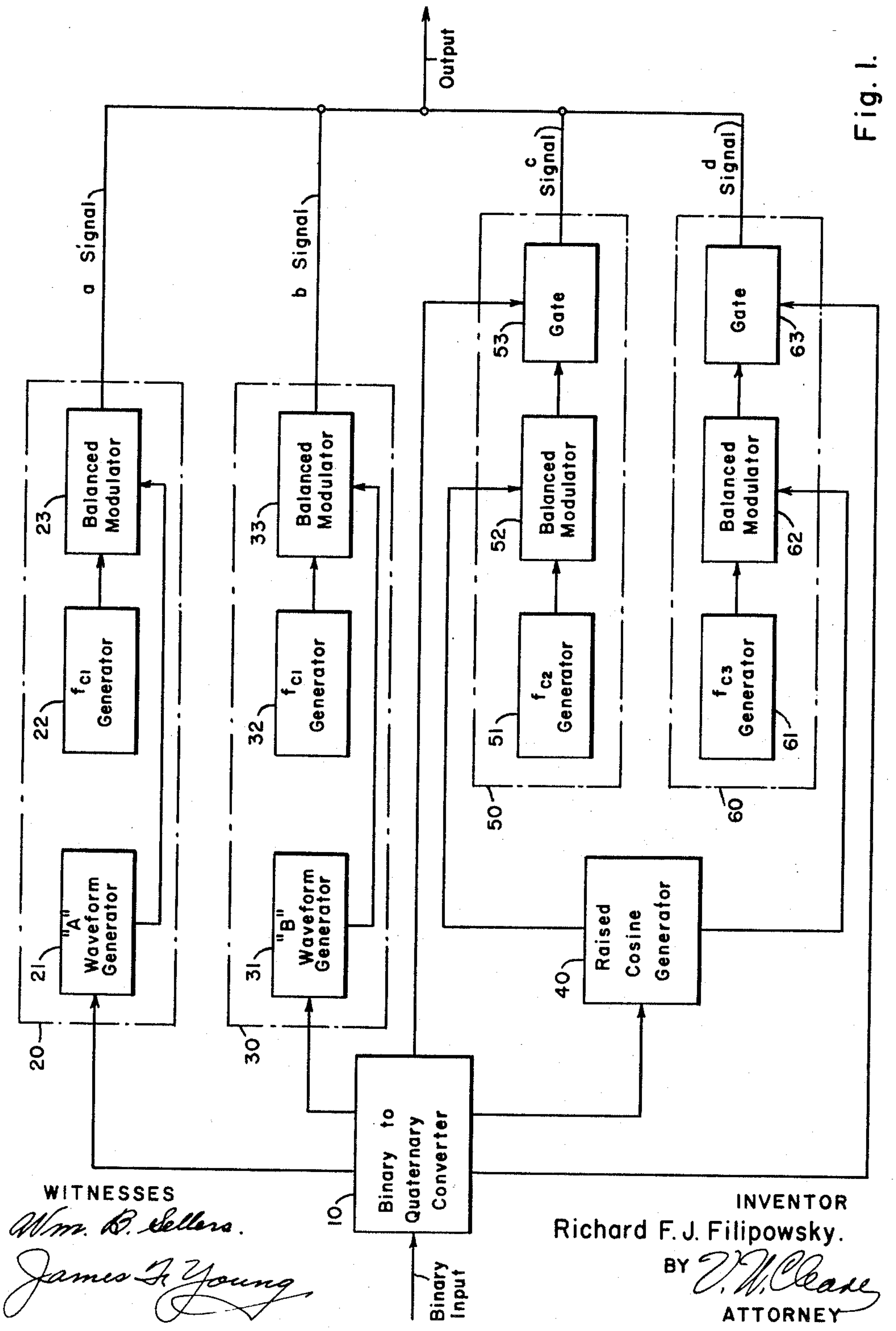
FIGURE 1 is a schematic diagram in block form of a transmitting station employing an embodiment of the invention.
Figures 2, 3:
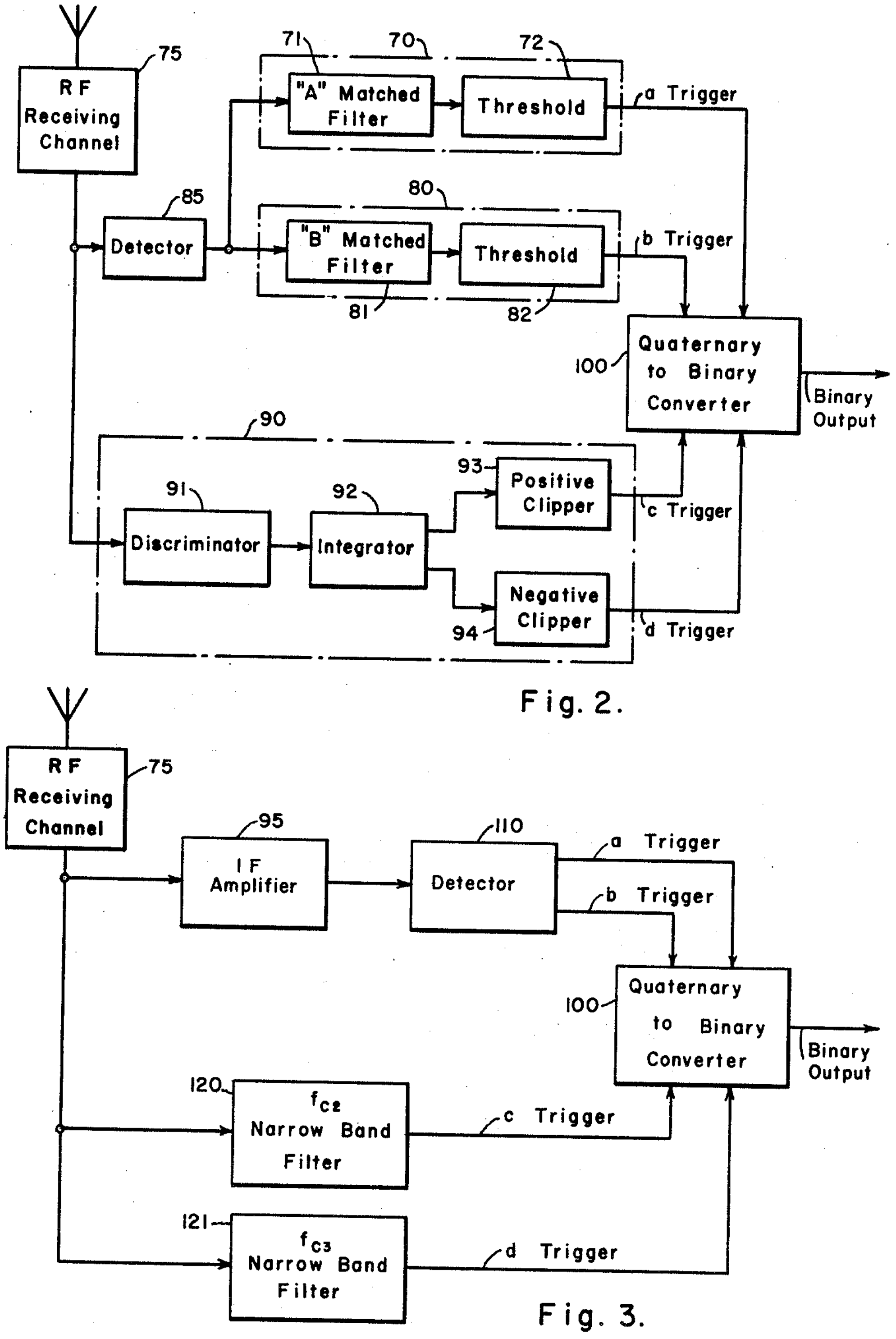
FIG. 2 is a schematic diagram in block form of a receiving station employing an embodiment of the invention.
FIG. 3 is a schematic diagram in block form of a receiving station employing an embodiment of the invention.

The embodiment of the present invention, as illustrated in FIGS. 1 and 2 consists generally of a binary to quaternary converter which converts to on-off, or mark space intelligence to a symbolic alphabet consisting of four quaternary symbolic signals. These signals will hereinafter be referred to as *a*, *b*, *c* and *d*. The binary information can be converted to quaternary information by one of several schemes, one of which is shown in FIG. 4, so that if two on signals occur, an *a* signal will be transmitted, an on-off or mark space information will be converted to a *b* signal, etc. In the embodiment illustrated in FIGS. 1 and 2, the signals *a*, *b*, *c* and *d* are in the form of double sideband suppressed carrier signals and the phase at which these signals arrive at the received station is not critical due to the characteristic of these suppressed carrier double sideband signals. Additionally, these signals are preferably transmitted with relatively long time duration so as to minimize the effect of echo signals from other transmission paths. The modulating signal employed to produce the *c* and *d* modulated output signals, are shown in FIG. 5(*c*). The modulating signals shown in FIGS. 5(*a*) and 5(*b*) are described in more detail in my copending application entitled Signal Transmission System, Serial No. 833,450 and filed August 13, 1959, now abandoned. These signals will hereinafter be referred to as "A" signals and "B" signals having waveforms as illustrated in FIGS. 5(*a*) and 5(*b*) respectively, wherein each is bidirectional with the leading and trailing edges thereof having a first derivative equal to zero.

The modulating signal A having a waveform as illustrated in FIG. 5(*a*) produces an output signal *a* when it modulates a carrier $f_c$ in double sidebands suppressed carrier modulation. The frequency spectrum or bandwidth of such a modulation is shown in FIG. 7(*a*). This modulation substantially defines the maximum bandwidth or frequency spectrum which the system will employ as will be understood from the later description.

The fourth or *d* signal is produced by modulating the same carrier $f_c$ by a B waveform illustrated in FIG. 5(*b*). When the B type waveform is employed as a modulating wave in a double sideband suppressed carrier modulation, its output signal will be as shown in FIG. 6(*b*). The B type waveform is used as a modulating signal in a double sideband suppressed carrier modulation so that the frequency spectrum or bandwidth required for transmission has a similar width as for the A waveform, that is signal *a* as shown in FIG. 5(*a*). The symbols *a* and *b* therefor, as shown in FIGS. 6, *a* and *b*, due to the characteristic of the modulating waveforms A and B, detection of these signals is quite accurate and virtually unaffected by phase changes since signal *a* will have 180° phase reversal in the middle of the wave, whereas signal *b* is symmetrical about the middle with no phase reversal in the middle of the waveform.

In the present invention the binary input is applied to the binary to quaternary converter 10 which in turn converts this information by a schedule such as shown in FIG. 4, to one of the four quaternary signals shown in FIG. 6. This information in the form of these quaternary signals is then transmitted to a receiving station which detects these signals and passes the information to a quaternary to binary converter 100 so as to provide binary information at the receiving station. These signals can be discriminated by their difference in envelope particularly as between the *a* and *b* signals. They can also be discriminated by their difference in bandwidth occupany that is the *a* and *b* signals can be discriminated against the *c* and *d* signals since the *c* and *d* signals occupy a much smaller portion of the band. The *c* and *d* signals can be differentiated between each other by their occupancy or concentration of energy in the upper or lower half of the transmitting band. Additional detection is possible by their symmetrical or skew-symmetrical character represented by a phase-jump of 180° or no phase-jump when discriminating the *a* signal from the *b*, *c* and *d* signals.

As can be understood, the disclosed system, due to the detection characteristics of the symbols, will be virtually unaffected by a phase change. More specifically, if the phase is altered in transmission between two adjoining signals proper and accurate detection will not be affected. Additionally, each individual symbol is not affected by the phase change of a preceding or subsequent symbol so that they are exclusively independent for passing information.

More specifically, the binary transmission system disclosed, as shown in FIGS. 1 and 2, comprises a binary to quaternary converter 10 which receives the binary or off-on information and converts it to a quaternary alphabet. Such a conversion could be in accordance with a scheme as shown in FIG. 4. It will be understood that other schemes could be employed to convert the binary information into a quaternary alphabet, such as two offs could be converted to an "a" symbol, an off and an on to a "b" symbol, etc. The binary to quaternary converter 10 actuates one of the four generator means shown in FIG. 1 and illustrated by the figures 20, 30, 50 and 60. The generator means 20, 30, 50 and 60 will produce an *a*, *b*, *c* or *d* output signal shown in FIG. 4 which is indicative of a predetermined binary input by a scheme such as that shown in FIG. 4. If two "on" signals are applied to the binary converter 10 the generator means 20 will be actuated by an impulse being applied to the A waveform generator 21. When the waveform generator 21 is actuated it will modulate a balance modulator 23. The balance modulator 23 is the type wherein the carrier of the modulator is suppressed while the two sidebands are produced as a result of the modulation. The modulator 23 is fed by a carrier frequency generator 22 which emits a center carrier frequency of $f_{c1}$. Hence, when the generator means 20 is actuated by a pulse from the binary to quaternary converter 10, sidebands will be produced and the output waveform will appear as shown in FIG. 6(*a*). The frequency band or spectrum of this output is shown in FIG. 7(*a*). As is shown in this figure, the frequency spectrum is symmetrical about the center frequency $f_{c1}$ and having outer limits near frequencies $f_1$ and $f_2$.

If a binary input occurs which is an on-off or mark and space information, the binary to quaternary converter 10 will actuate the generator means 30 by applying a pulse to the B waveform generator 31. This will effect actuation of this generator means 30 similarly, as was done to generator means 20. Generator means 30 includes a balance modulator 33 of the type described above wherein the carrier is suppressed but the sidebands are emitted. The balance modulator 33 is fed by a radio frequency carrier generator 32 which has a signal output having the same center frequency as carrier frequency generator 22, namely $f_{c1}$. The output of this generator means 30 will appear as signal shown in FIG. 6*b* having a bandwidth or frequency spectrum as shown in FIG. 7(*b*). It will be noted that this frequency spectrum is also symmetrical about the center frequency $f_{c1}$. However, a comparison of the signal *a* shown in FIG. 6(*a*) and signal *b* shown in FIG. 6(*b*) illustrates that the signal *a* has a phase reversal of 180° at the center thereof, whereas signal *b* is at a maximum at this point.

In the specific embodiment illustrated herein, if the binary input is a space and mark, a pulse will be applied from the binary converter 10 to a raised cosine generator 40. This raised cosine generator 40 generates a raised cosine wave as shown in FIG. 5(*c*) which waveform is applied to both the generator means 50 and generator means 60. If a space and mark binary input is applied to the converter 10, the generator 40 will be actuated and additionally, a gate 53 will be opened to permit the passage of the output of generator means 50. The generator means 50 includes a balance modulator 52 which produces a double sideband suppressed carrier output. The modulator 52 is fed by a radio frequency carrier generator 51 which generates a carrier center frequency signal having a center frequency of $f_{c2}$. As shown in FIG. 7(*c*), frequency $f_{c2}$ is located within the lower sideband of the sidebands for signals *a* and *b*. Hence, when a space and mark is applied to the converter 10 the raised cosine generator will apply a raised cosine waveform to the balance modulator 52 which will emit a double sideband suppressed carrier having a center frequency of $f_{c2}$. Additionally the space mark being applied to the converter 10 will produce an output pulse from the converter 10 to thereby open gate 53 so as to permit the passage of the "*c*" signal being generated by the balance modulator 52.

The output of the generator means 50 will appear as a waveform as illustrated in FIG. 6(*c*). The frequency spectrum or bandwidth of this waveform is shown in FIG. 7(*c*) and as can be seen, is symmetrical about a center frequency $f_{c2}$ and is concentrated in the lower sideband of the signals *a* and *b* explained above. Thus it can be seen that the signal *c* can be detected from the signals *a* and *b* by the concentration of energy in the lower half of the sidebands of the signals *a* and *b*. Additionally, of course, the actual waveform shape of the signal *c* can be detected from the signals *a* and *b*.

If it is desired to generate the signal *d*, as for example in the scheme illustrated in FIG. 4, when it is desired to transmit two binary space signals, the generator means 60 will be actuated by the binary converter 10. That is, when two binary spaces are applied to the binary converter 10 the raised cosine generator 40 will be actuated to apply a raised cosine waveform to the balance modulator 62. Additionally, a gate 63 at the output of the generator means 60 will be opened to permit the passage of signal *d* to the output of the transmitter. The balance modulator is of the type described above and similar to modulators 23, 33 and 52. All of these modulators produce a double sideband suppressed carrier output. The balance modulator 62 is fed by radio frequency carrier generator 61 which produces a radio frequency output signal having a center frequency of $f_{c3}$. As shown in FIG. 7*d*, the output of the generator means 60 produces an output waveform similar to the output of the generator means 50. However, in the case of generator means 60 the bandwidth or frequency spectrum of the output waveform is concentrated in the upper sidebands of the signals *a* and *b*, and the sidebands as distributed about a center frequency $f_{c3}$ located in the upper sidebands of the signals *a* and *b*. Hence, it is seen that although the output of the generator means 50 and 60 is similar in appearance as shown in FIGS. 6(*c*) and (*d*), the signal *d* produces an output waveform which has sidebands that are distributed or centered about the center frequency $f_{c3}$ whereas the *c* signal produces sidebands distributed about a center frequency $f_{c2}$. As shown in FIG. 7, these center frequencies are located generally in the middle of the sidebands of the signals *a* and *b*. Hence, for this reason, although the output waveforms of generator means 50 and 60 are similar, they can be detected from each other by the concentration of energy in the upper and lower sidebands of the signals *a* and *b*. Additionally, as will be understood, detection of these waveforms is not dependent upon the phase or presence of any of the other symbols.

The waveform generator 21 could be of the type disclosed in my copending application Serial No. 731,915 filed April 30, 1958, and entitled "Generator for Signals Having Skew Sine Waveforms," now abandoned. The waveform generator 31 could be of the type as disclosed in copending application Serial No. 731,907, filed April 30, 1958, entitled "Oscillator," now abandoned. The raised cosine generator 40 could be of any type known in the art which produces the raised cosine waveform as illustrated in FIG. 5(*c*).

When the transmitted information reaches the receiving station it is applied to detector means 70, 80 and 90, after these detector means determine the presence of an *a*, *b* or *c* and *d* signals respectively. The outputs of these detector means is fed to a quaternary to binary converter 100 which produces a binary output in accordance with a quaternary input applied thereto.

The detector means 90 determines the presence of either a *c* or *d* type signal, shown in FIG. 6. This detector means comprises a conventional discriminator 91 which is connected to the receiving channel 75. The output of discriminator 91 is connected to an integrator 92. The output of the integrator 92 is connected to the positive clipper 93 and a negative clipper 94 which are in turn connected to the quaternary to binary converter 100. If the output of the integrator 92 is positive going and exceeds a predetermined threshold there will be an output trigger from the positive clipper 93 which is indicative of the presence of the *c* type signal. If the output of the integrator 92 is negative going and exceeds a predetermined threshold there will be an output trigger from the negative clipper 94 which indicates the presence of a *d* type signal.

The presence of an *a* type signal is determined by detector means 70 which is connected to detector 85 and comprises a matched filter for the *a* type waveform 71, the output of which is connected to a threshold 72. If the output of the matched filter 71 exceeds a predetermined threshold there will be an output trigger emanating from the threshold 72 and applied to the quaternary to binary converter 100 to provide the equivalent binary information transmitted. Such an "*a*" type filter 71 or "*b*" filter 81 are shown in U.S. Patent No. 3,097,339, issued July 9, 1963, entitled "Generator and Matched Filter for Waveforms," and assigned to the assignee of the present invention. The presence of a *b* type signal is determined by detector means 80 which comprises a matched filter for the *c* type waveform 81. The output of the matched filter 81 is applied to a threshold 82. If the output of the matched filter 81 exceeds a predetermined threshold the presence of a *b* type signal is determined when an output trigger is passed from the threshold 82 to the quaternary to binary converter 100 so as to provide at the output thereof the equivalent binary information corresponding to the *b* type signal.

FIG. 3 illustrates still another receiving station for the transmitter shown in FIG. 1. In this receiver, a detector 110 is connected to an IF amplifier 95 to detect the *a* and *b* signals. This detector is described in U.S. Patent No. 3,054,956, issued September 18, 1962, entitled Detector for Symbolic Waveforms. The *c* and *d* type signals are detected by narrow band filters 120 and 121. Filters 120 and 121 are tuned to the center frequencies $f_{c2}$ and $f_{c3}$ respectively so that an output signal from filter 120 indicates the presence of a *c* signal while an output from filter 121 indicates the presence of a *d* signal.

Detector 110 as well as filters 120 and 121 are connected to the converter 100 to convert the quaternary information into binary information by a scheme such as illustrated in FIG. 4.

Whereas the invention has been shown and described with respect to an embodiment thereof which gives satisfactory results, it should be understood that changes may be made and equipment substituted without departing from the spirit and scope of the invention.

I claim as my invention:

1. A system for transmitting a plurality of intelligence signals comprising, means for producing a first symbolic electrical signal having a first center frequency modulated by a first bidirectional symbolic waveform so as to provide a first plurality of sidebands, means for producing a second electrical signal having the same center frequency as said first center frequency and modulated by a second bidirectional symbolic waveform so as to provide a second plurality of sidebands, means for producing a third electrical signal having a second center frequency above said first center frequency and modulated by a third unidirectional symbolic waveform so as to provide a third plurality of sidebands, means for producing a fourth electrical signal having a third center frequency below said first center frequency and modulated by said third symbolic waveform so as to provide a fourth plurality of sidebands, and said third and said fourth plurality of sidebands being intermediate said first and said second plurality of sidebands.

2. A pulse communications system for transmitting a plurality of intelligence signals comprising, means for producing a first symbolic electrical signal having a first center frequency modulated by a first symbolic waveform so as to provide a first plurality of sidebands, said first symbolic waveform being bidirectional with the beginning and trailing edges thereof having a first derivative equal to zero, means for producing a second electrical signal having a second center frequency and modulated by a second symbolic waveform so as to provide a second plurality of sidebands, said second symbolic waveform having a raised cosine shape, means for producing a third electrical signal having a third center frequency and modulated by a raised cosine waveform so as to provide a third plurality of sidebands, means for producing a fourth electrical signal having a frequency the same as said first center frequency and modulated by a third symbolic waveform, said third symbolic waveform being bidirectional and having leading and trailing edges having a first derivative equal to zero, said second and said third center frequency being located intermediate the ends of said first and said fourth sidebands.

References Cited by the Examiner

UNITED STATES PATENTS

| | | | |
|---|---|---|---|
| 2,301,373 | 11/42 | Cox | 178—51 |
| 2,480,705 | 8/49 | Brian | 178—66 |
| 2,557,950 | 6/51 | Deloraine et al. | 179—15.6 |
| 2,832,817 | 4/58 | Raibourn | 179—15 |
| 2,839,728 | 6/58 | Jacoby et al. | 332—1 |
| 2,855,462 | 10/58 | Adams | 179—15 |
| 2,870,429 | 1/59 | Hales | 179—15.6 |
| 2,986,597 | 5/61 | Teer | 178—6 |

DAVID G. REDINBAUGH, *Primary Examiner.*

L. MILLER ANDREW, ROBERT H. ROSE, *Examiners.*